(12) United States Patent
Langlois et al.

(10) Patent No.: US 7,923,857 B2
(45) Date of Patent: Apr. 12, 2011

(54) SYSTEM AND METHOD FOR SUPPLYING POWER FOR ACTUATORS ON BOARD AN AIRCRAFT

(75) Inventors: Olivier Langlois, Leguevin (FR); Etienne Foch, Toulouse (FR); Lucien Prisse, Toulouse (FR); Xavier Roboam, Colomiers (FR)

(73) Assignee: Airbus France, Toulouse (FR)

( * ) Notice: Subject to any disclaimer, the term of this patent is extended or adjusted under 35 U.S.C. 154(b) by 369 days.

(21) Appl. No.: 12/013,082

(22) Filed: Jan. 11, 2008

(65) Prior Publication Data

US 2008/0174177 A1    Jul. 24, 2008

(30) Foreign Application Priority Data

Jan. 16, 2007   (FR) ...................... 07 52705

(51) Int. Cl.
*B60L 1/00* (2006.01)
(52) U.S. Cl. ....................................... 307/9.1
(58) Field of Classification Search ................... 307/9.1
See application file for complete search history.

(56) References Cited

U.S. PATENT DOCUMENTS

| 5,939,800 A * | 8/1999 | Artinian et al. ................. 307/64 |
| 2005/0179264 A1* | 8/2005 | Ganev ......................... 290/40 C |
| 2006/0061213 A1* | 3/2006 | Michalko ...................... 307/9.1 |
| 2008/0111420 A1* | 5/2008 | Anghel et al. ................. 307/9.1 |

FOREIGN PATENT DOCUMENTS

| EP | 0 444 997 A1 | 9/1991 |
| EP | 1 650 846 A1 | 4/2006 |
| GB | 2 290 390 A | 12/1995 |

\* cited by examiner

*Primary Examiner* — Jared J Fureman
*Assistant Examiner* — Dru M Parries
(74) *Attorney, Agent, or Firm* — Oblon, Spivak, McClelland, Maier & Neustadt, L.L.P.

(57) ABSTRACT

The invention relates to a system and a method for supplying power to an aircraft comprising several generators supplying alternating current to several different primary electrical master boxes (10, 11, 12 and 13), the various aircraft loads being connected to each of these master boxes. This system comprises conventional master boxes (10, 11, 12 and 13) which supply power loads and at least one master box (40, 41) devoted to actuator loads, this at least one devoted master box being connected to conventional master boxes.

17 Claims, 16 Drawing Sheets

SYSTEM AND METHOD FOR SUPPLYING POWER FOR ACTUATORS ON BOARD AN AIRCRAFT

TECHNICAL FIELD

The invention relates to a system and method for supplying power for actuators on board an aircraft, for example an airplane.

In what follows, an aircraft of the airplane type will be considered in order to simplify the description.

STATE OF THE PRIOR ART

The increase in electrical energy used on future airplanes is leading to an increase in the number of generators and electrical master boxes. An example of an architecture for generating and distributing electricity in such an airplane is given in FIG. 1. This shows four generators GEN 1.1, GEN 1.2, GEN 2.1 and GEN 2.2 supplying alternating voltage (for example 230V AC) to four separate electrical master boxes 10, 11, 12 and 13 for a first and second side 14 and 15 of the airplane. The airplane's various electricity consumers (loads) are connected to each of these master boxes. For example, the loads 20, 21, 22 and 23, appearing on this FIG. 1, are typical of a "more electric" airplane without drawing air from the engines ("bleedless"). These are specifically:

- ECS1-ECS4 air conditioning units ("Environmental Conditioning System"),
- protective elements against icing WIPS1-WIPS4 ("Wing Ice Protection System"),
- engine starters (jet engines) DM1-DM4,
- actuators A1-A2 for flight control, braking of the wheels, etc. (EHA: "Electro-Hydrostatic Actuator", EMA: "Electro-Mechanical Actuator" . . . ).

In such an architecture, two different electrical circuits E1 and E2 can supply the airplane's actuators: A1 (consisting of n actuators A11 . . . A1n) and A2 (consisting of m actuators A21 . . . A2m). These two electrical circuits E1 and E2 are allocated by the two sides 14 and 15 of the airplane, which is necessary to provide continuity of supply in case of failure of one of these two electric circuits E1 and E2. In fact, two actuators are frequently used to move a single flight control surface. By supplying these actuators A1 first and A2 second by the two electric circuits E1 and E2, a flight control surface can be actuated with a single one of the two electric circuits E1 or E2.

FIG. 2 gives an example of the layout of certain flight control surfaces 9 in an airplane, with the actuators corresponding to them. This example shows the principle of spreading the actuators between two supply circuits E1 and E2.

FIG. 3 gives the principle of generation and distribution of the first electric circuit E1. In this example, this circuit E1 is supplied by the first side 14 of the airplane, i.e. either by the generator GEN 1.1, or by the generator GEN 1.2.

The distribution of the electric circuit E1 is implemented as alternating current, as 230 volts alternating, for example, which means that each actuator A11 . . . A1n and A21 . . . A2m is supplied with this alternating voltage. As these actuators each consist of a synchronous machine auto controlled by an inverter, it is necessary that they each have an internal direct current bus, such as 540 volts direct current, for example. This bus is obtained by rectifying the three phase voltages from the network, by means of a static converter, as illustrated in FIG. 4. This figure, which illustrates the typical constitution if an electric actuator, thus comprises successively between the 230 volts alternating network (230V AC) 28 and the mechanical load 19:

- a rectifier 30,
- a +/−270 volts (540V DC) direct current bus 31,
- a bus capacitor 32,
- an energy dissipation resistance 33,
- an inverter 34, and
- an electric motor MS.

For reasons of robustness, bulk, weight and cost, the rectifier 30 is generally produced by a simple diodes bridge. Even in the most complex rectifier topologies encountered at present in aeronautical engineering, this rectifier 30 is produced based on diodes. Such a rectifier is not reversible in power.

As the mechanical load 29 can generate energy, the motor MS and the inverter 34 being reversible in power, energy can be sent to the direct current bus 31. As this cannot reach the alternating network 28 owing to the rectifier 30, this energy generated by the mechanical load 29 must then be stored or dissipated in the direct current bus 31. In current actuators, this energy is dissipated through the resistance 33.

The dissipation of energy 27 in the actuator 29 involves heating of the latter, which is an additional constraint for its sizing: its cooling must therefore be particularly careful.

When switching on an actuator, by closing the associated contactor 25 as illustrated in FIG. 3, a call for current is made owing to the energy needed to charge the bus capacitor 32, as illustrated in FIG. 4. These calls for current, which are limited only by the impedance of the generators and leads, can reach high values.

If the actuators are switched on simultaneously, the large number of simultaneous calls for current can create faults (circuits tripping) or even damage to equipment.

If several actuators are switched on sequentially, by closing the contactors 25 one after the other, delays are caused on the actuators supplied last.

Moreover, this does not prevent the high current peaks demanded by each actuator.

A technical problem which arises is thus that of:
- handling the reversibility in power of the actuators to avoid heating; and
- handling the switching on of the actuators to avoid calls for current.

The purpose of the invention is a system and a method for supplying power for actuators on board an airplane, capable of solving such a technical problem.

DESCRIPTION OF THE INVENTION

The invention relates to a system for supplying power to an aircraft comprising several generators feeding alternating current to several distinct electrical master boxes, the various loads in the aircraft being each connected to each of these electrical master boxes, characterised in that it comprises conventional master boxes which supply power loads and at least one master box devoted to actuator loads, and in that at least one devoted master box is connected to conventional master boxes.

Advantageously, an actuator comprises, between a 230V alternating current network and a load:
- a direct current bus,
- a bus capacitor,
- an inverter, and
- an electric motor, a collective rectifier being used for a number of actuators.

Advantageously, each conventional master box and each devoted master box comprises an alternating current busbar and a direct current busbar.

Advantageously, this at least one devoted master box comprises an electric circuit for the actuators, allowing the static conversion necessary to handle transfers of powers between the electrical generators and the actuators.

Advantageously, the system in the invention comprises bidirectional means of power transfer between the devoted master boxes and the electrical circuits for the actuators.

Advantageously, the system in the invention comprises bidirectional means of power transfer between the devoted master boxes and the conventional master boxes.

Advantageously, these means of transferring power comprise controllable converters.

Advantageously, the link between the devoted master boxes and the actuator loads is produced as direct current and at high voltage.

The invention also relates to a process for implementing this system in which a bidirectional power transfer is made between at least one devoted master box and an electric "actuator" circuit.

Advantageously, a transfer of power is made between at least one devoted master box and a conventional master box.

Advantageously, power is supplied to actuator loads:
via a normal supply, or
via an HVDC supply, or
by a backed up power supply.

Advantageously, the power generated by the actuator loads:
via a normal rejection, or
via a HVDC rejection, or
via a storage rejection, or
via a dissipation rejection.

Advantageously, the condensers present on the HVDC buses and the actuator loads are switched on gradually.

Advantageously, the HVDC bus is pre-charged from a devoted master box:
by pre-charging this devoted master box from the alternative busbar,
by precharging a conventional master box from the direct current busbar
by precharging from a storage system.

Advantageously, the power generated by the actuators during the aircraft's braking phases is recovered.

The invention also relates to an aircraft including such a system and an aircraft likely to implement such a method.

The advantages of the system and of the method in the invention are in particular as follows:

It is not necessary to dissipate the energy which these generate in the actuators. This energy can be rejected to the direct current network, at various levels and by various means. Thermal stresses are reduced, as are volume and density. Reliability is improved.

The rectifier in the head of each actuator can be shared, which then permits a reduction of the power sizing. A gain in volume, weight and reliability is again noted here.

The energy wasted, in the event of various failures of the power transfer systems in the devoted master box, can be dissipated by a surge suppressor system specially provided for this purpose.

It is possible, by means of controlled converters, to produce controlled loads for the condensers present in the master boxes and the actuators.

A controlled converter, supplying one or more actuators, can offer, as well as precharging the capacitors, protection of the circuit supplying this or these actuator(s) by controlling the current produced.

Redundancy of the means of power transfer allows great availability of electricity. This availability is improved still more owing to the technological differences between systems (AC/DC rectifiers, DC/DC converters, etc.).

The risks of instabilities of direct current networks are avoided thanks to using static converters between the various points of each network.

DETAILED DESCRIPTION OF PARTICULAR EMBODIMENTS

Figure 1:
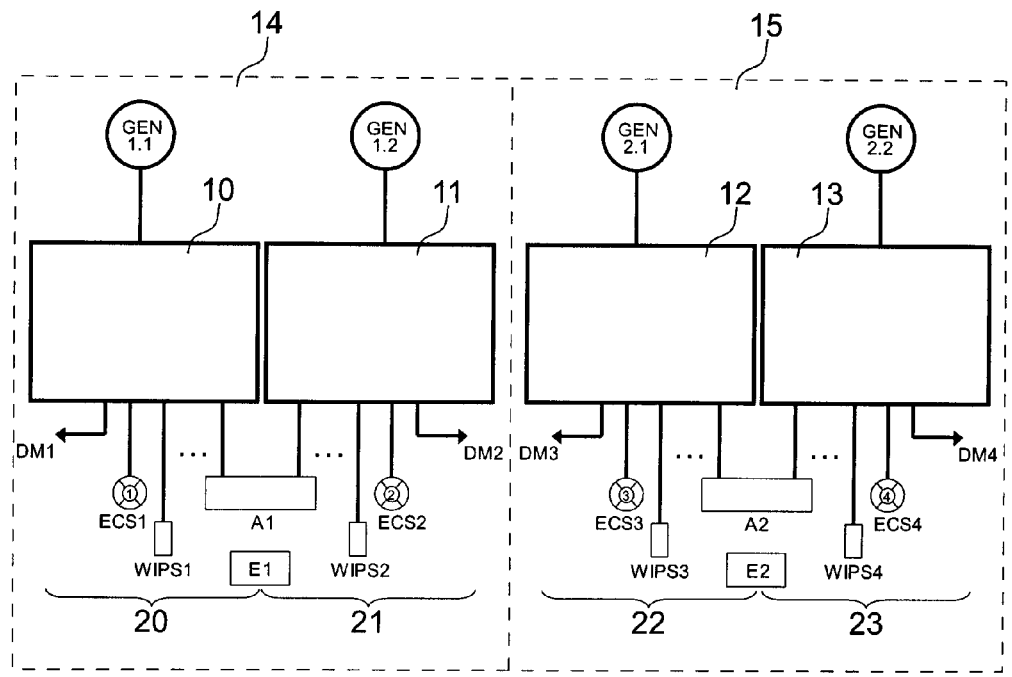
FIG. 1 illustrates an architecture for electricity generation/distribution of the known art for a "more electric" airplane of the "bleedless" type.
Figure 2:
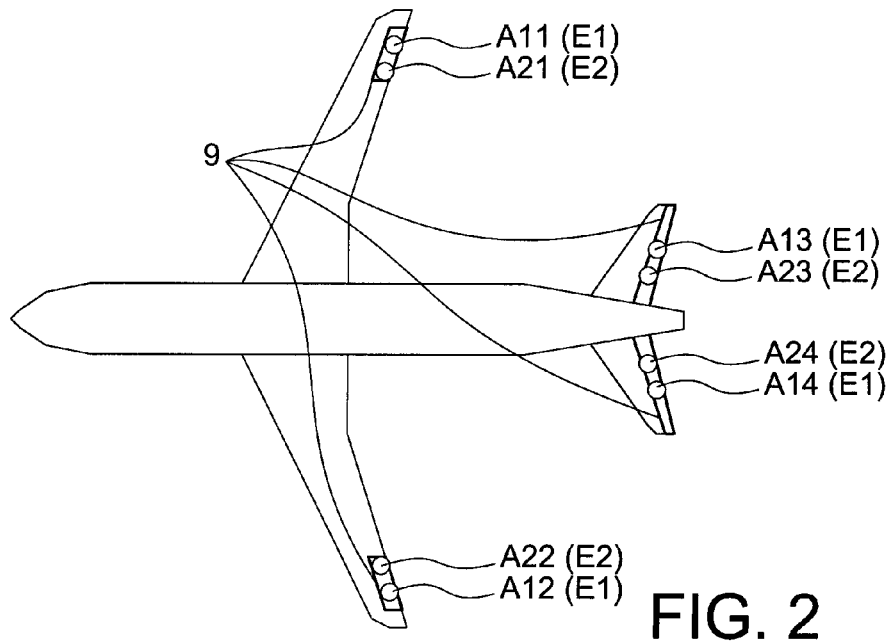
FIG. 2 illustrates an example of the distribution of a few flight control actuators, each of the flight control surfaces represented being activated by two actuators.
Figure 5:
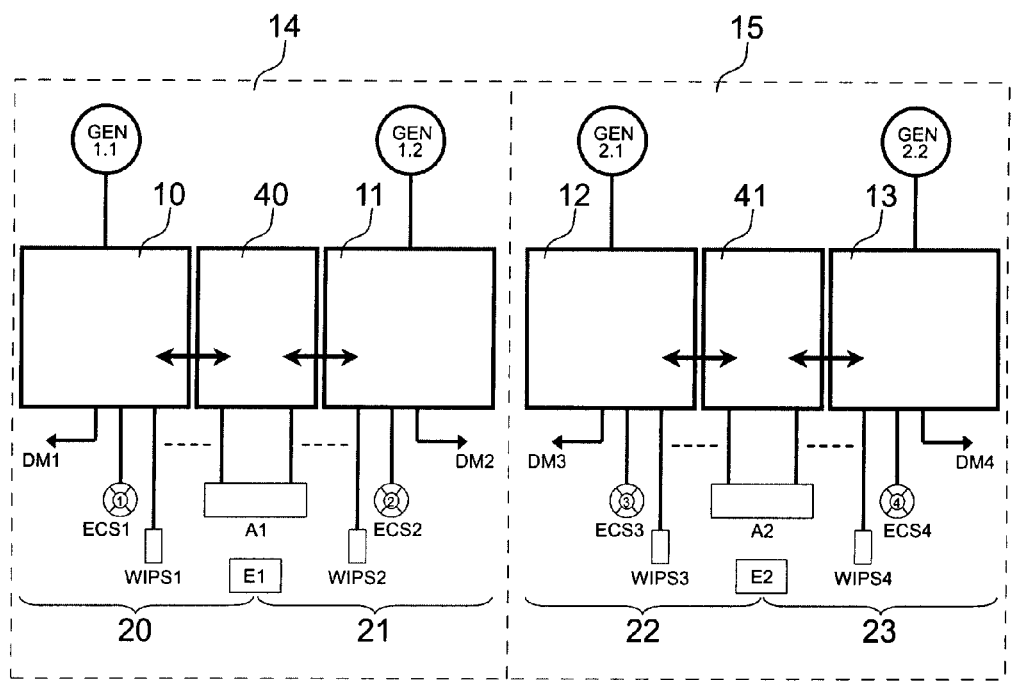
FIG. 5 illustrates the power supply system according to the invention for a "more electric" airplane of the "bleedless" type, with a devoted "actuator" master box on each side of the aircraft.

In FIG. 5, which illustrates the system in the invention, there are the items illustrated already in FIG. 1, viz.:

four generators GEN 1.1, GEN 1.2, GEN 2.1 and GEN 2.2,
four distinct electrical master boxes 10, 11, 12 and 13 for a
   first and a second side 14 and 15 of the airplane,
loads 20, 21, 22 and 23, in particular:
   air conditioning units ECS1-ECS4,
   elements to protect against icing WIPS1-WIPS4,
   engine starters DM1-DM4,
   actuators A1-A2.

There are also two master boxes 40 and 41 devoted to actuators A1-A2.

Indeed, in order to improve the segregation of the electrical circuits, and given the high number of systems to be placed in the master boxes, the "actuator" loads are supplied by these devoted master boxes 40 (first side 14) and 41 (second side 15). These "devoted" master boxes 40 and 41 are connected to conventional master boxes 10, 11 first and 12, 13 second, on a single side of the airplane. The devoted master box 40 is therefore connected to the master boxes 10 and 11. The devoted master box 41 is connected to the master boxes 12 and 13.

The "conventional" master boxes 10, 11 and 12, 13 still supply the "power" loads: ECS1-ECS4, WIPS1-WIPS4, DM1-DM4, etc.

The system in the invention comprises means of bidirectional power transfer, acting in a reversible manner rand controlled within the "actuator" loads connected to the electrical circuits E1 and E2. Bidirectional power transfers must take place between these electrical circuits E1 and E2 and the devoted master boxes 40 and 41, as well as between these devoted master boxes 40 and 41 and the "conventional" master boxes 10, 11, 12 and 13.

Figure 6:
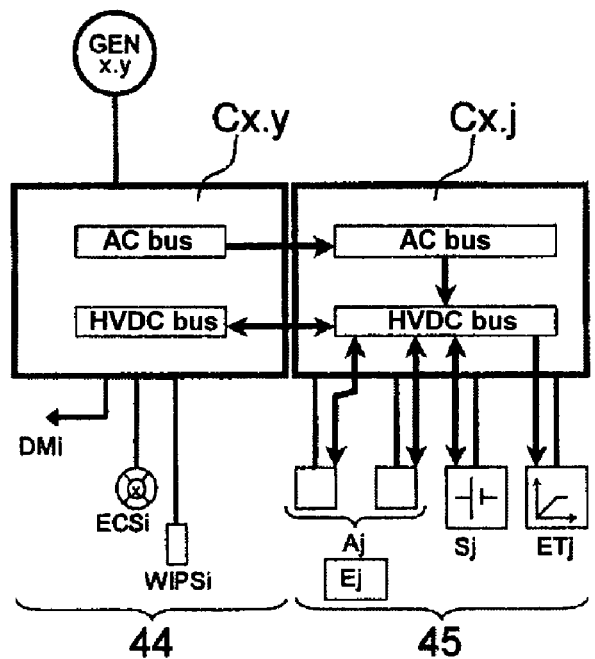
FIG. 6 illustrates the principle of power transfers around the devoted master box.

FIG. 6 illustrates the power transfers which can be implemented in the following three units:
   actuator loads Aj,
   devoted master box Cx.j,
   conventional master box Cx.y.

This block diagram thus shows a devoted master box Cx.j attached to a conventional master box Cx.y.

On this FIG. 6 are thus represented:
   a conventional master box Cx.y comprising:
   an alternating current busbar (AC),
   a direct current busbar (HDVC), connected to "power" loads 44, viz.:
   a starter motor DMi,
   an air conditioning unit ECSi,
   an element protecting against icing WIPSi, in connection with:
   a devoted master box Cx.j comprising:
   an alternating current busbar,
   a direct current busbar,
   connected to "actuator" loads 45, viz.:
   actuators Aj (EHA, EMA, etc.),
   a storage element Sj,
   a voltage surge suppressor ETj.

In practice, such an architecture is perfectly feasible with one or more devoted master boxes attached to one or more conventional master boxes. FIG. 5 shows a devoted master box attached to two conventional master boxes.

In order to facilitate power transfers, and in particular bidirectional transfers, the link to "actuator" loads is produced as high voltage direct current (HVDC: "High Voltage Direct Current"). The devoted master boxes Cx.j thus comprise alternating current (AC) and direct current (HVDC) busbars.

The storage element Sj is connected to the HVDC bus for the "actuator" electrical circuit Ej. This storage element Sj can be a bank of batteries or of supercapacitors, a kinetic energy accumulator of the inertia wheel type, etc. The voltage surge suppressor ETj is arranged in the same manner.

The characteristics of the system according to the invention will be analysed below.

1) Energy Management

The concept of an electrical master box devoted to the actuators allows great flexibility in use, and sundry redundancies in case of a breakdown of one of the systems of the power transfer chain. This concept offers great security of operation for "actuator" loads connected to the electrical circuit Ej.

Figure 7:
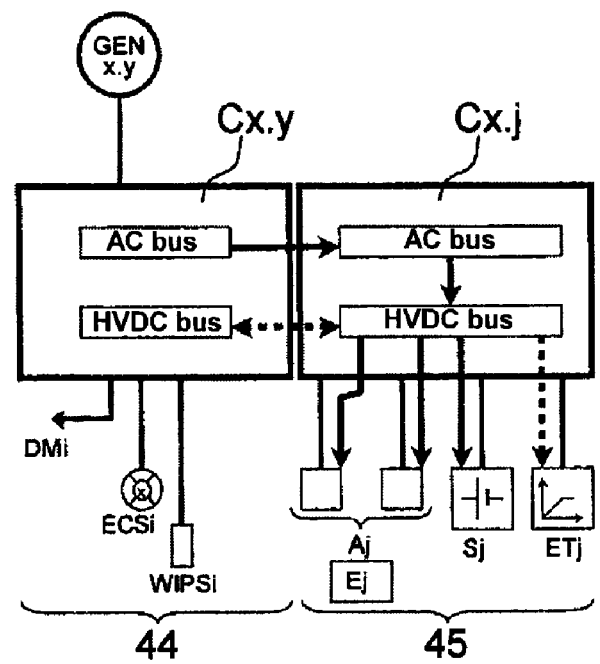
FIGS. 7, 8 and 9 illustrate the delivery of power to "actuator" loads by a normal power supply, by a HVDC supply and by a backed-up supply respectively.
Figure 8:
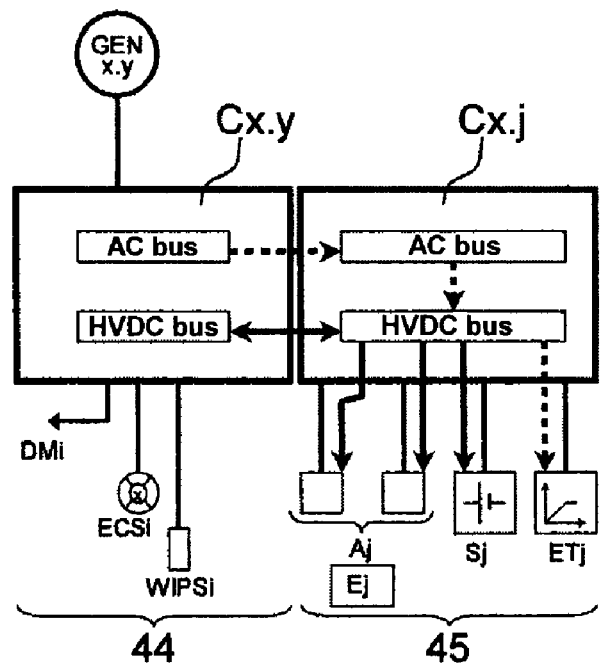
Figure 9:
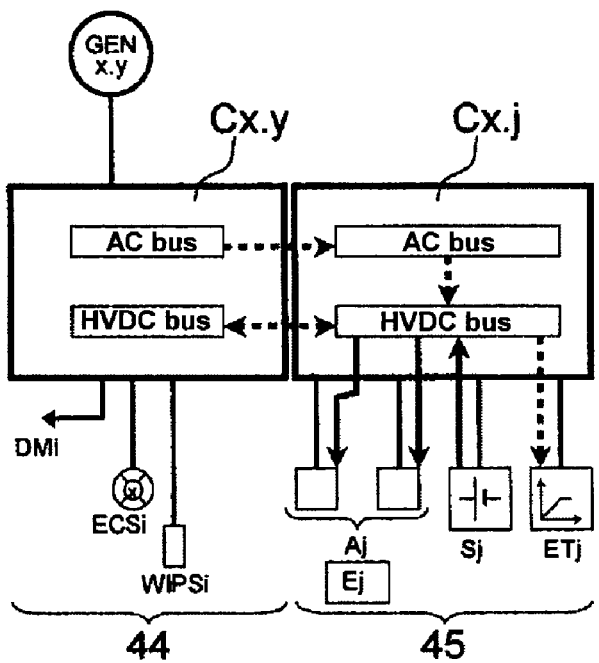

The system according to the invention can manage:
   the supply of power to "actuator" loads in the electrical circuit Ej,
   the power rejected by the "actuator" loads in the electrical circuit Ej, The delivery of power to the "actuator" loads in the electrical circuit Ej can be implemented in three different ways:
   by a normal supply, as illustrated in FIG. 7; delivery of power to the electrical circuit Ej and charging of the storage system Sj being implemented via the alternating current (AC) buses of the master boxes Cx.y and Cx.j;
   by a HVDC supply, as illustrated in FIG. 8; delivery of power to the electrical circuit Ej and charging of the storage system Sj being implemented via the direct current (HVDC) buses of the master boxes Cx.y and Cx.j;
   by a backed up supply, as illustrated in FIG. 9; delivery of power to the electrical circuit Ej being implemented by the storage system Sj.

This last option is particularly useful in the case of loss of the normal electricity generation, where the airplane is in last resort electrical backup mode. The storage Sj is then capable of supplying the "actuator" loads during short duration transient periods, occurring during operation in last resort electrical backup mode. Such a transient period occurs, inter alia, between the instant when the normal electricity supply is lost and the instant when the backup generator is actually started.

Figure 10:
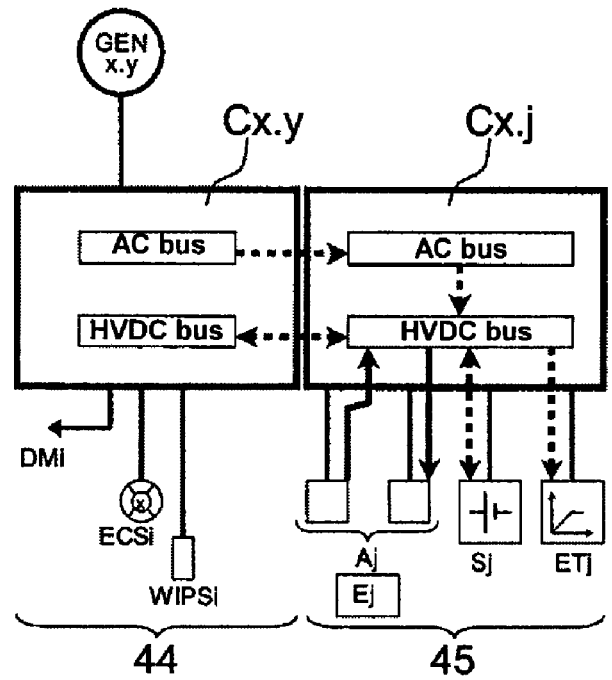
FIGS. 10, 11, 12 and 13 illustrate the evacuation of power generated by "actuator" loads, by a normal rejection, by a HVDC rejection, by a storage rejection and by a dissipation rejection respectively.
Figure 11:
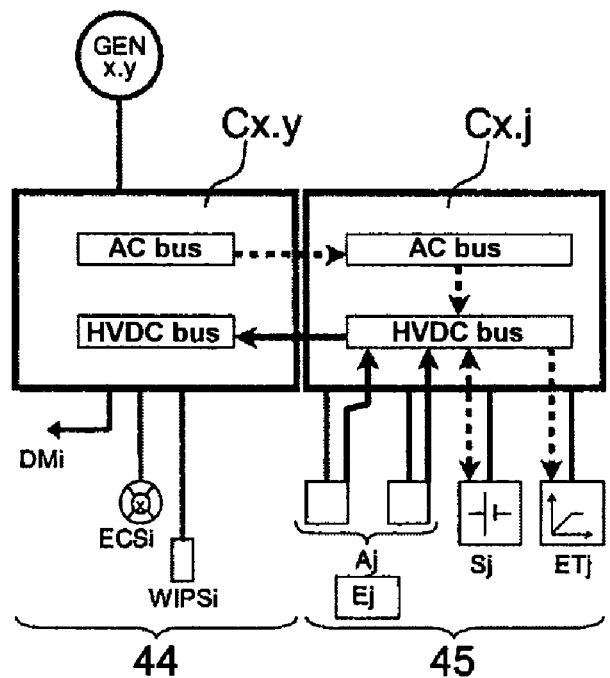
Figure 12:
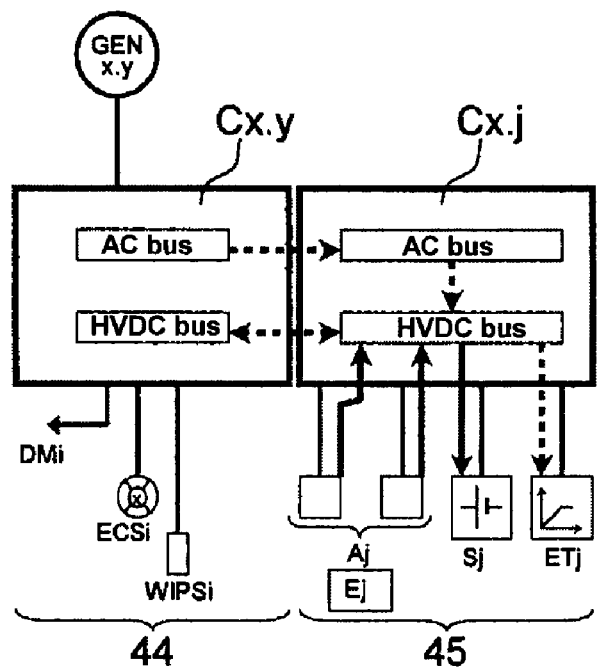
Figure 13:
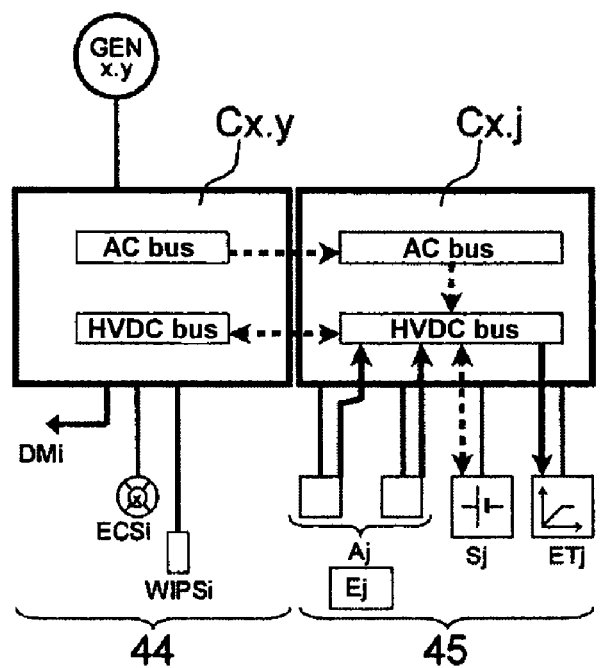

The evacuation of the power generated by the "actuator" loads in the electrical circuit Ej can also be implemented in four different ways:
   by a normal rejection, as illustrated in FIG. 10; all the "actuator" loads being supposed not to reject power simultaneously, the loads absorbing power being supposed dominate compared with loads producing power, the power rejected by an actuator being absorbed directly by another actuator in the same electrical circuit Ej;
   by HVDC rejection, as illustrated in FIG. 11; all the actuators producing power rejected in the "conventional" master box Cx.y via the HVDC buses, this power then being consumed by the various loads present in the "conventional" master box Cx.y;
   by storage rejection, as illustrated in FIG. 12; all the actuators producing power which is rejected in the storage system Sj;
   by dissipation rejection, as illustrated in FIG. 13; all the actuators producing power, rejected in the voltage surge suppressor ETj, which dissipates the recovered energy.

This latter option is for safety if the three preceding options are inhibited, in particular following failures. Without the surge suppressor Ej, the voltage in the HVDC bus would be abnormally high, leading to equipment damage.

These three power recovery options, plus the additional possibility of dissipation via the voltage suppressor Ej, can avoid any energy dissipation system in the actuators, and thus solve the first part of the technical problem of the prior art as defined previously. The dimensioning and reliability of the actuators are improved thereby.

2) Distribution of a Direct Current Network

Figure 14:
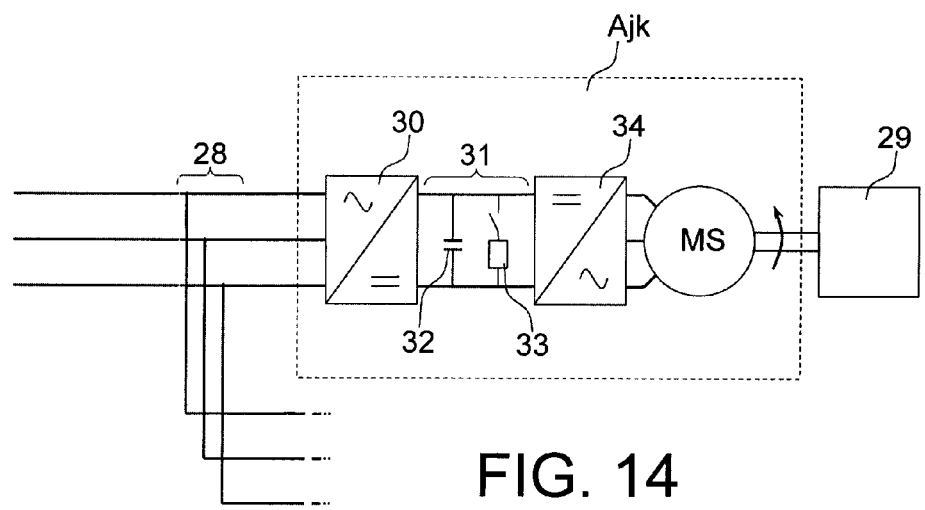
FIGS. 14 and 15 illustrate a detail of the connection of several actuators to an alternating current network and to a direct current network respectively.
Figure 15:
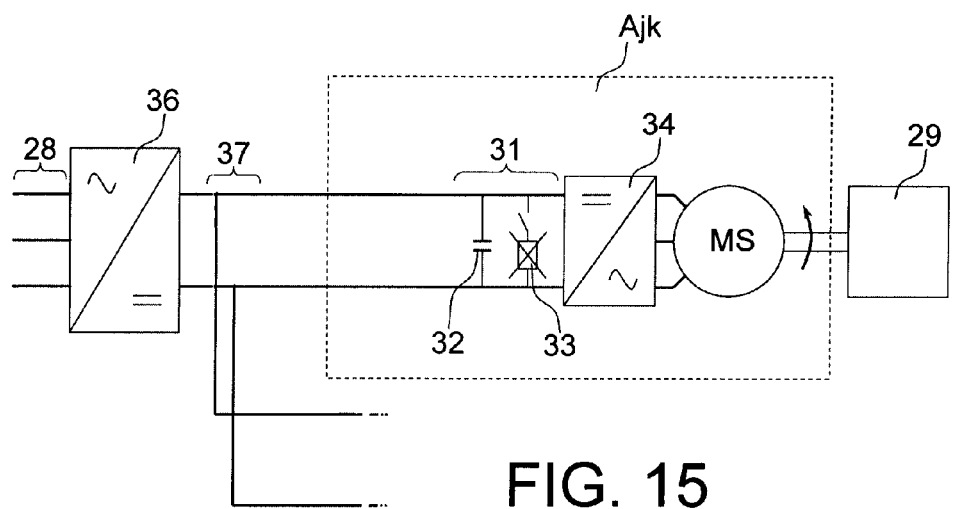

Distribution in the airplane of a direct current network 37 is particularly interesting for elimination of the rectifier input stage 30 in each actuator. FIG. 14 and FIG. 15 show the difference between supplying converters with alternating (FIG. 14) and direct (FIG. 15) current.

Figure 3:
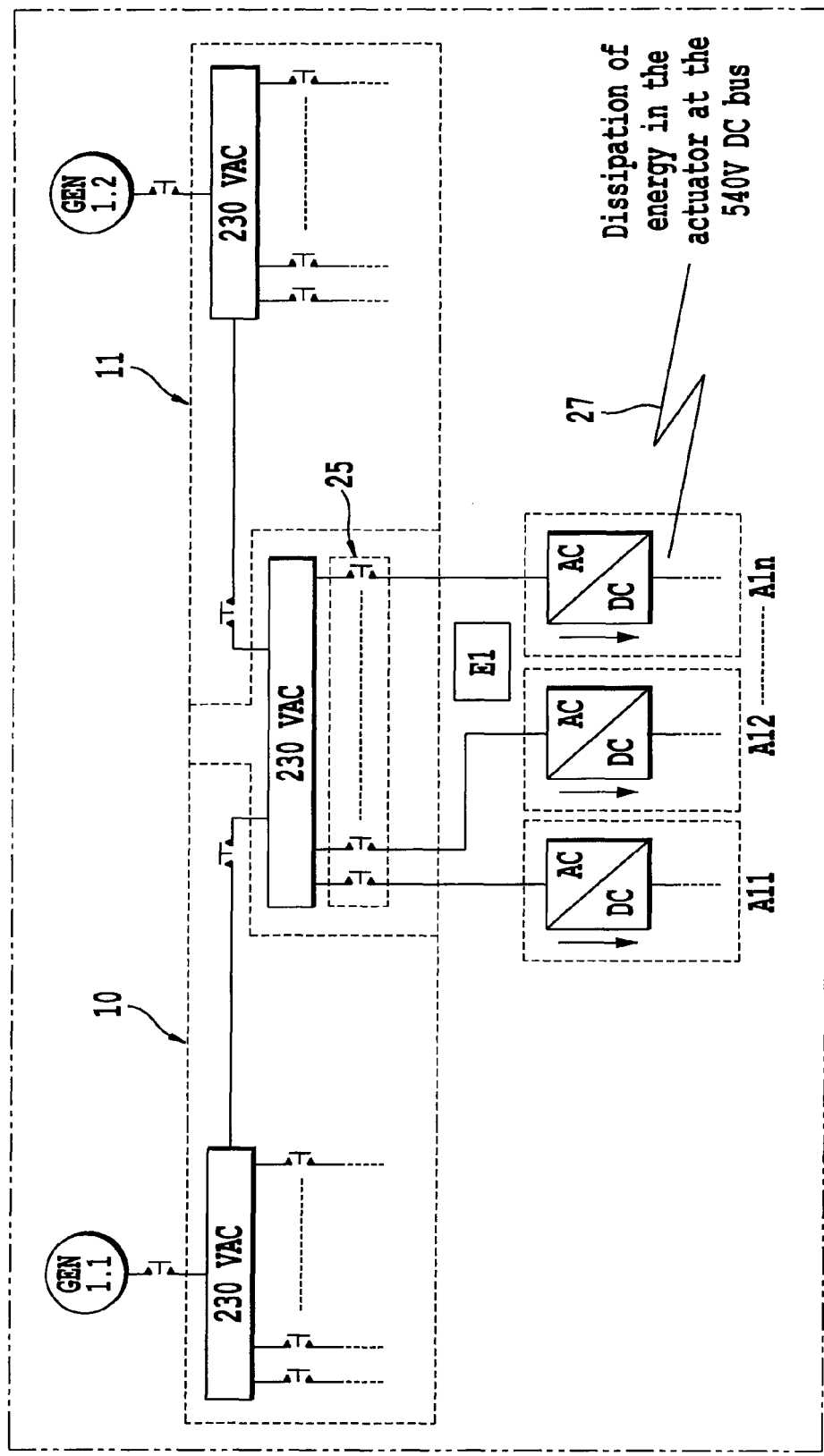
FIG. 3 illustrates a detail of the generation/distribution of an electrical circuit E1 for the electrical actuators illustrated in FIG. 1.
Figure 4:
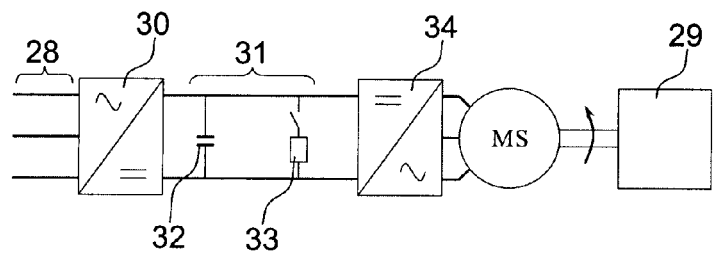
FIG. 4 illustrates the typical constitution of an electrical actuator.

In FIGS. 14 and 15 are repeated the items illustrated in FIG. 3, viz.:
- a 230V AC network 28,
- a rectifier 30,
- a HVDC voltage bus 31,
- a bus capacitor 32,
- an energy dissipation resistance 33,
- an inverter 34,
- an electric motor MS,
- a load 29.

The advantages of a direct current supply 37 as illustrated in FIG. 15 are as follows:
- elimination of the system capable of dissipating energy rejected by the actuator Ajk (by the resistance 33), the power being in the main rejected in the direct current network 37,
- elimination of the individual rectifier 30 in each actuator Ajk, a collective rectifier 36, used for several actuators, distributing the direct current in the airplane. The dimensioning of the collective rectifier 36 is less than the sum of the dimensions of each local rectifier. Indeed, the actuators Aj do not absorb their maximum power simultaneously (presence of build-up). The peak power absorbed by the set Aj of actuators Ajk is thus less than the sum of the peak powers absorbed by each actuator. Globalisation or sharing of the converters 30 is therefore beneficial.

These two characteristics contribute to allowing a gain in space and weight. Reliability is also increased owing to the reduction of heating in the actuators. The collective rectifier 36, placed at the level of the electrical master boxes in a well controlled environment (temperature), can increase its reliability.

Moreover, with management of the power transfers between the HVDC busbars and the loads, instabilities due to the distribution of a direct current electricity network can be countered.

3) Pre-Charging of the Capacitors

The invention can also respond to the problem of the prior art, relating to sudden charges of the capacitors present on the HVDC buses and the "actuator" loads.

Indeed, transfers between the busbars, whether they are alternating (AC) or direct (HVDC) current are, in most cases, implemented with static converters. One or more of these static converters can then be controlled in order to manage power transfers and sometimes to regulate bus voltages. With controllable converters, it is possible to consider gradual switching on over time of the capacitors present on the HVDC buses and "actuator" loads. Calls for current can then be very significantly reduced, even for high values of capacitance of the condensers.

Thus, by supposing the presence of controllable converters between the various busbars, it is possible to implement precharging of the HVDC busbar (from a devoted master box):
- by precharging from the alternating current busbar of the same devoted master box, via a controlled rectifier;
- by precharging from the direct current busbar of a conventional master box, via a controlled DC/DC converter;
- by precharging from the storage system, via a controlled DC/DC converter or controlled AC/DC converter according to the type of storage.

Moreover, by using one or more controllable DC/DC converters between the HVDC busbar and the "actuator" loads, it is possible to effect precharges of the capacitors for each actuator by this or these converter(s).

These controllable converters can also provide protection of the cable outlet in the airplane using an appropriate control limiting the current, for example.

Still using the controllability of these converters, it is possible to avoid instabilities on the network generated by the "actuator" loads.

Three functions can be coupled by using such controllable converters:
- slow charging of the actuator capacitors when they are switched on (pre-charging);
- protection of the electrical conductors (electrical circuit breaker feature) and/or limitation of the current absorbed by a load;
- management of any instabilities caused by the actuators.

Specimen Embodiment

Figure 16:
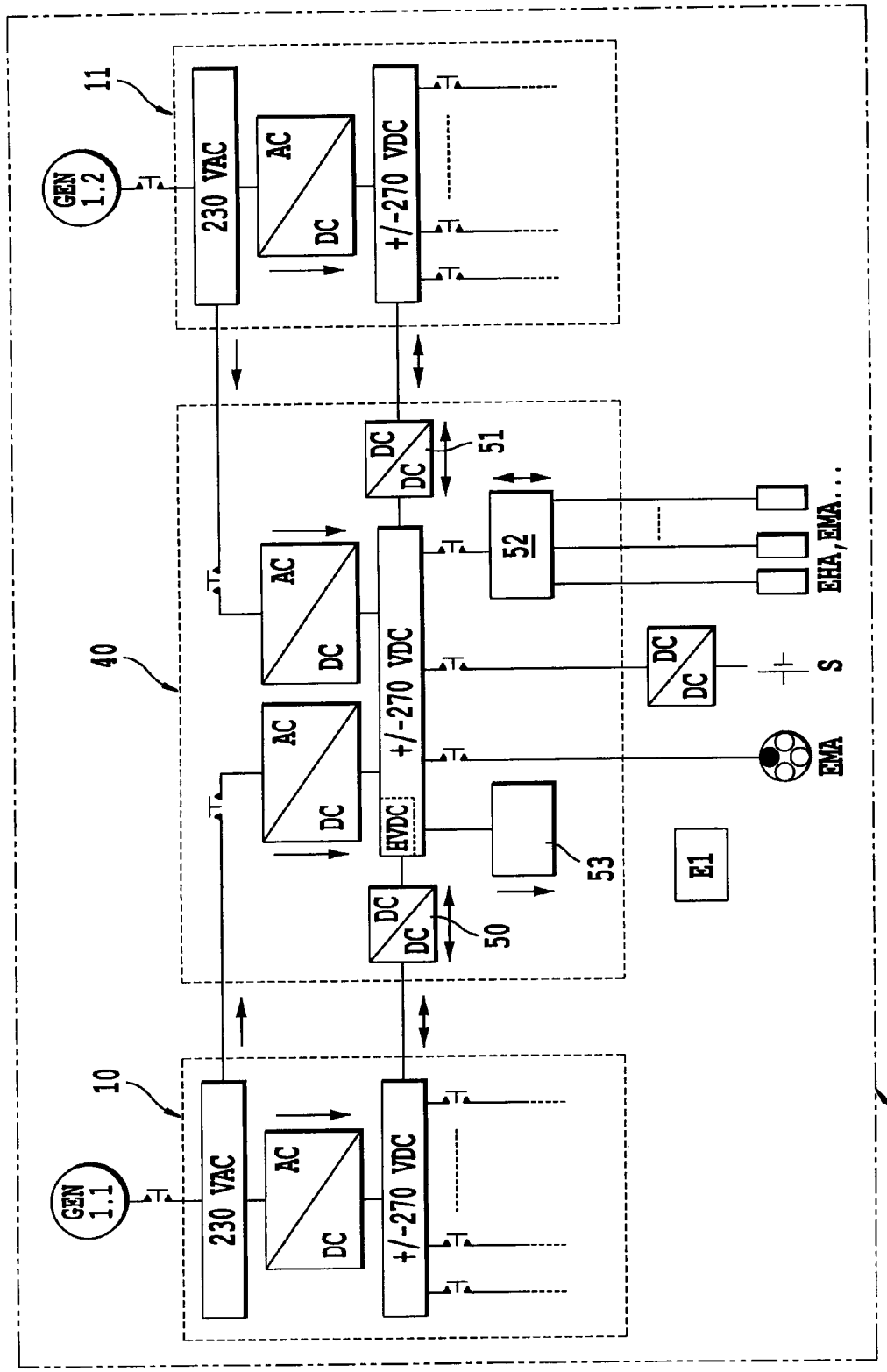
FIG. 16 illustrates a detail of the generation/distribution of an electrical circuit E1 for the actuators, with a devoted master box.

An example of the detailed architecture for generation and distribution of the electrical circuit E1 is given in FIG. 16. In this example, the devoted master box 40 is connected to two conventional master boxes 10 and 11. In this figure, some loads, viz. a braking actuator EMA and several flight control actuators EHA, EMA, etc. are illustrated by way of example.

The transfers between the +/−270 volts direct current (DC) from the devoted master box 40 and each conventional master box 10 and 11 are implemented by two DC/DC converters 50 and 51, reversible in power.

In the devoted master box 40, the bus controller 52 placed between the HVDC busbar and the flight control actuators can be formed by one or more DC/DC converters. As mentioned above, this or these converter(s) 52 can play a double role of capacitor precharger and protection. In the devoted master box 40, there is also a surge suppressor 53.

Below will be analysed successively several methods of supplying power to an electrical circuit E1 for actuators and several methods of power rejection.

1. First Method of Supply: Normal Operation

Figure 17:
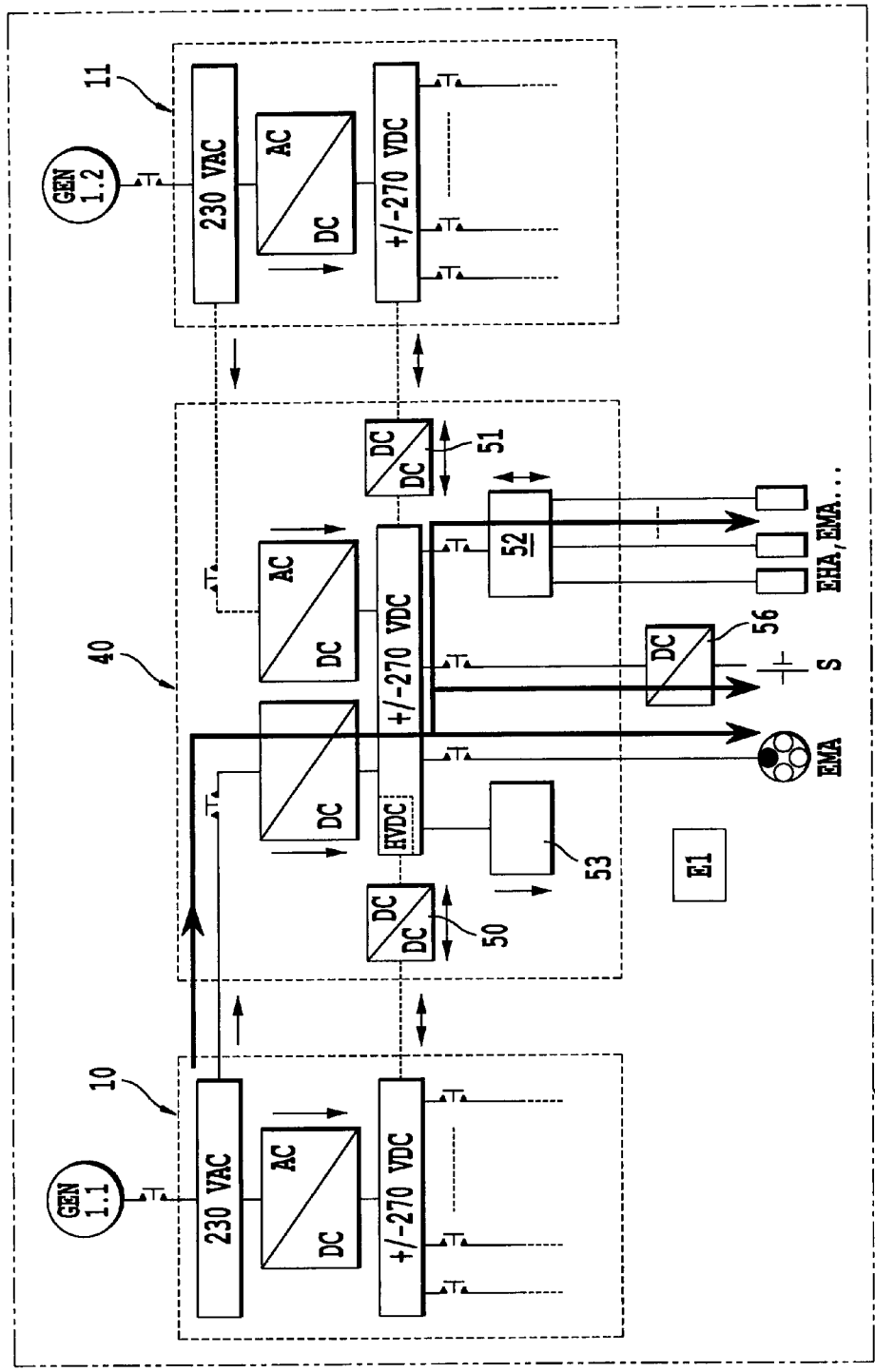
FIGS. 17, 18 and 19 illustrate the supply of an electrical circuit E1 for the actuators by the rectifier, by the transfer converters and by the storage system respectively, for the example in FIG. 16.

The normal power supply of each of the +/−270V DC HVDC busbars is obtained by a devoted AC/DC rectifier 55, as illustrated in FIG. 17. The HVDC busbar of the devoted master box 40 is supplied here by the master box 10, via this rectifier 55. However, it can also be supplied by the master box 11 via the rectifier 57. In case of failure on the supply channel of the conventional master box 10, the conventional master box 11 repeats the supply for the devoted master box 40.

In this normal method of operation, all the actuators can be supplied, and the storage element S can be charged via a devoted DC/DC converter 56.

2. Second Method of Supply: Supply in HVDC, by Transfer Converters

Figure 18:
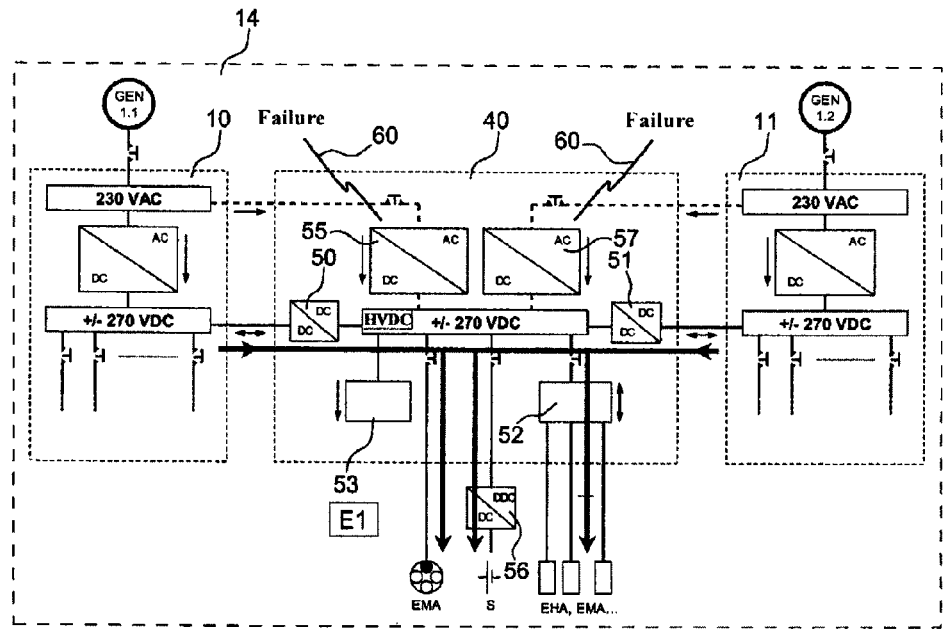

In case of failure 60 of the rectifiers 55 and 57 of the devoted master box 40, it is possible to supply the +/−270V HVDC busbar directly from the DC/DC transfer converters 50 and 51, as illustrated in FIG. 18. These converters 50 and 51 can operate simultaneously in order to transfer more power to this HVDC busbar.

In this method of operation, as in the normal method of operation, all the actuators can be supplied and the storage element S can be charged.

3. Third Method of Supply: Supply by the Storage System

Figure 19:
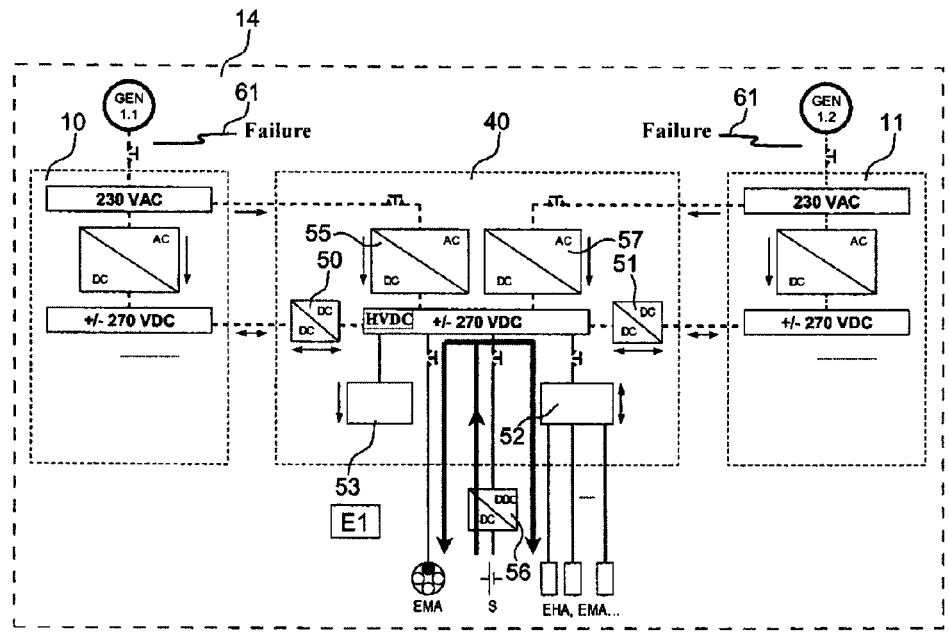

In this method of supply for the HVDC busbar, the means of storage S, as illustrated in FIG. 19, is used. Such an option is particularly useful in case of failure 61 of normal generation (GEN 1.1, GEN 1.2, GEN 2.1 and GEN 2.2). This means of storage S supplies the "actuator" loads during periods of inactivity of the backup generator.

4. First Method of Rejection: Rejection Directly on the HVDC Bus

Figure 20:
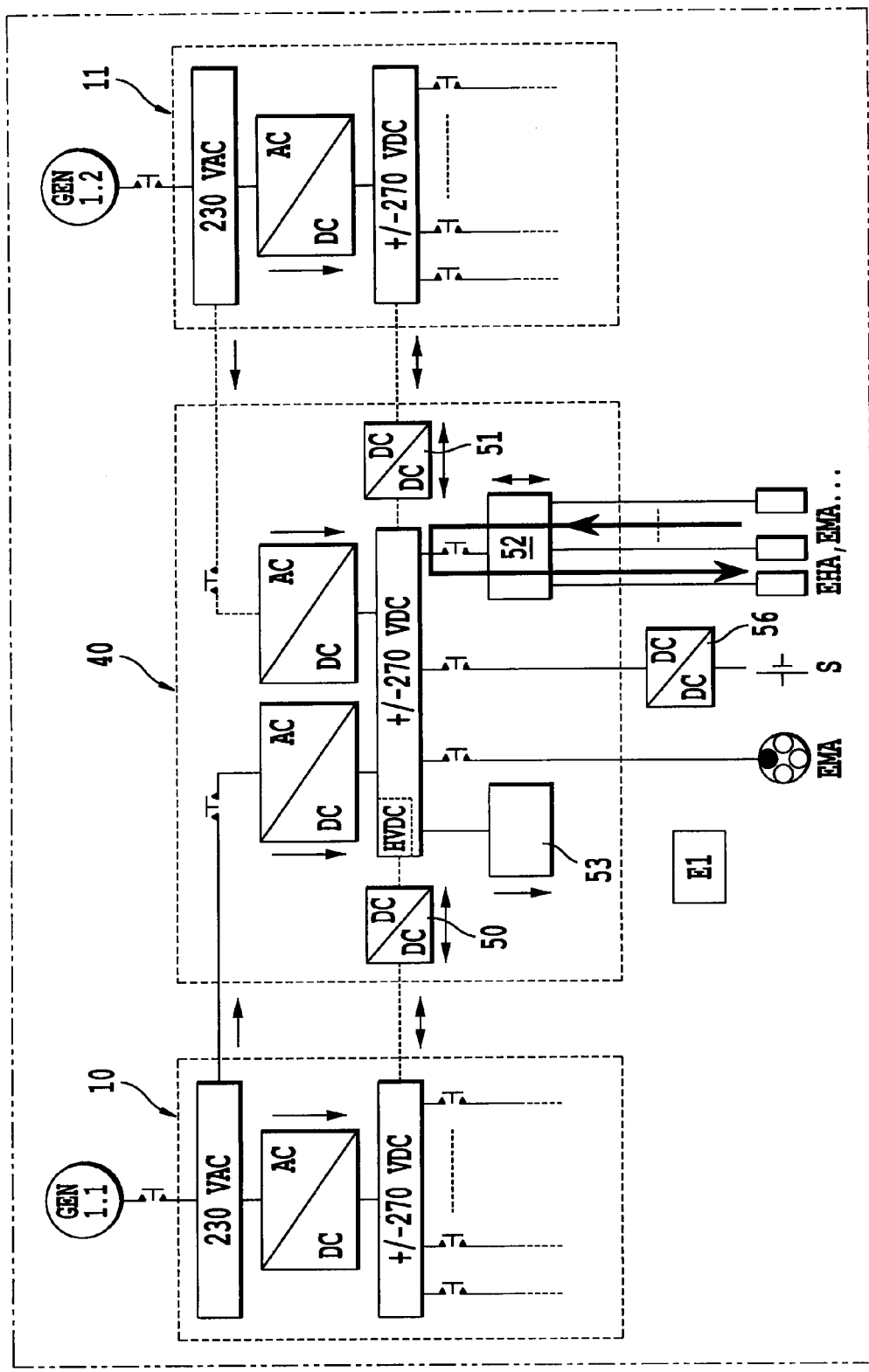
FIGS. 20, 21, 22 and 23 illustrate the power rejection produced by an actuator directly to another actuator, by transfer converters, in the storage system and in the surge suppressor, for the example in FIG. 16.

In this first method of rejection, the energy produced is transferred from one actuator to another actuator consuming energy, as illustrated in FIG. 20. The power then transits on to the HVDC busbar, but is used locally (within the devoted master box 40) and instantaneously.

5. Second Method of Rejection: in HVDC, by Transfer Converters

Figure 21:
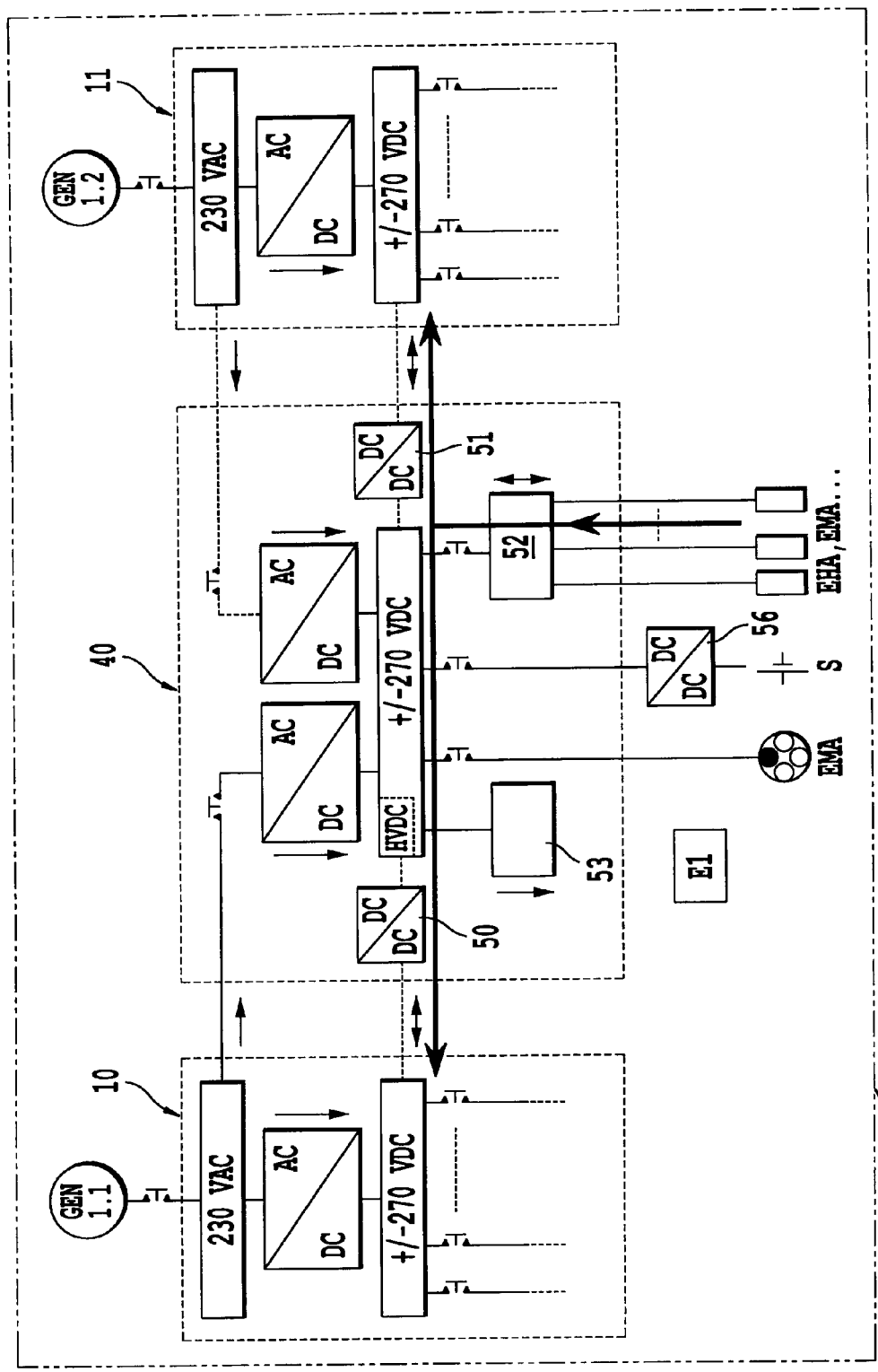

The energy produced by the "actuator" loads is sent to the conventional master boxes 10 and 11 via the DC/DC transfer converters 50 and 51, as illustrated in FIG. 21.

6. Third Method of Rejection: by the Storage System

Figure 22:
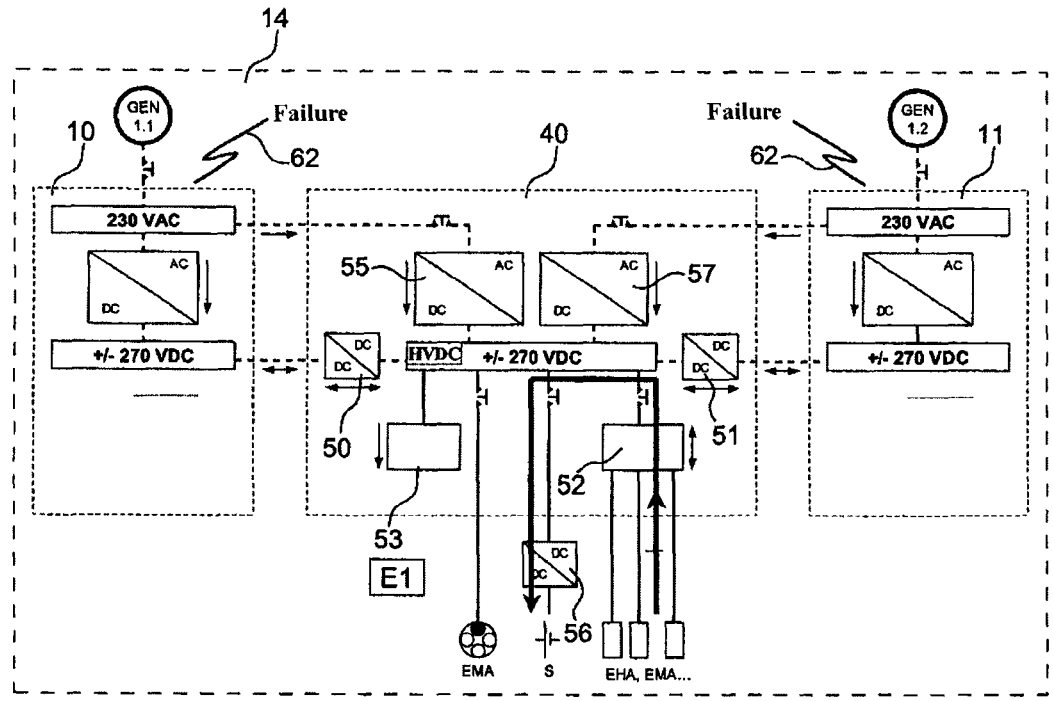

The energy produced by the "actuator" loads is sent into the storage system S, which has a DC/DC converter 56, as illustrated in FIG. 22 (case of failure 62 of master boxes 10 and 11).

7. Fourth Method of Rejection: Dissipation in the Surge Suppressor

Figure 23:
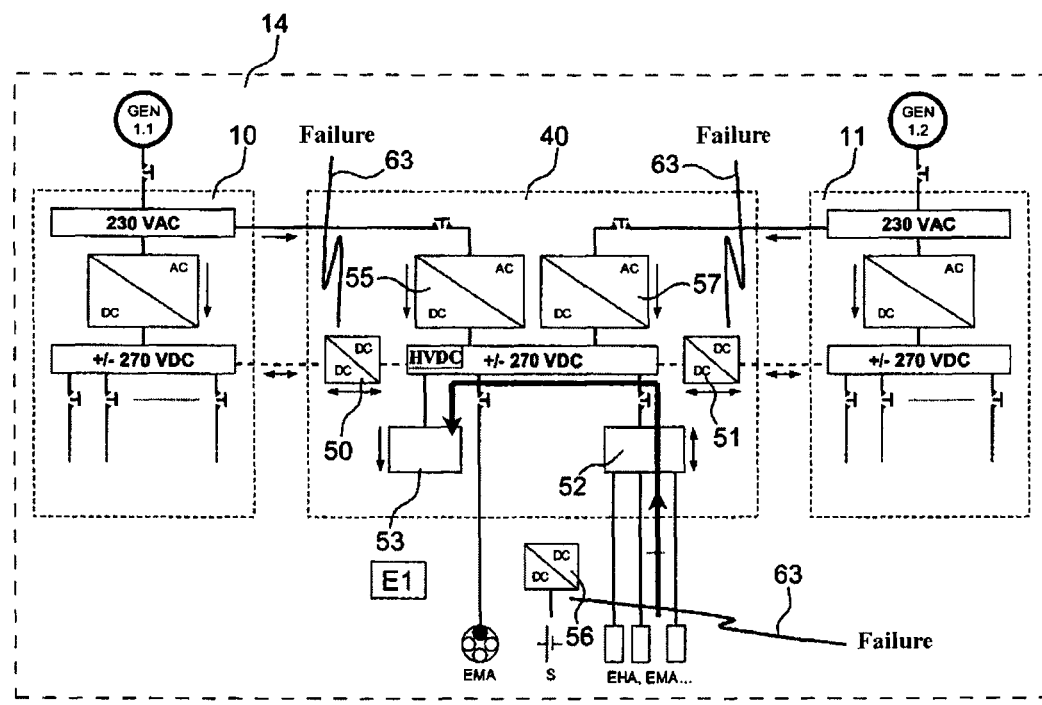

In this method of rejection, the energy generated in the actuators is dissipated in the surge suppressor 53 as illustrated in FIG. 23 (case of failure 63 of the converters 50, 51 and 56). This surge suppressor 53 can be very simple in form, with a non-reversible current hasher and a dissipation resistance.

The different methods of precharging the actuator capacitors will now be considered.

Figure 24:
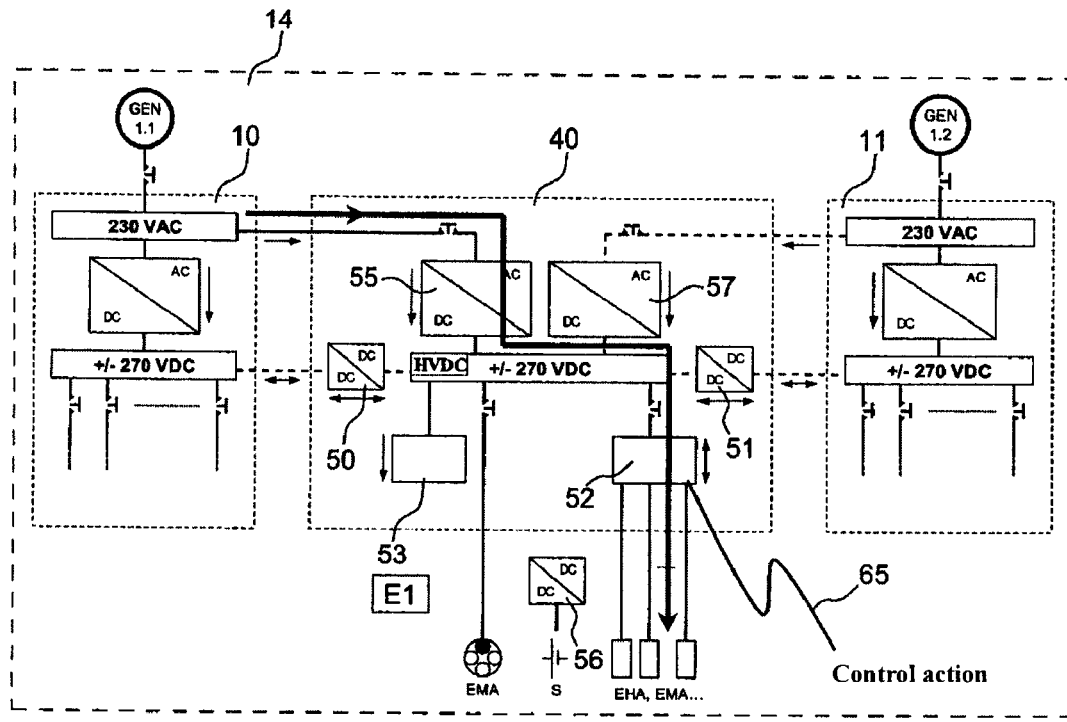
FIG. 24 illustrates a controlled precharging of the actuator capacitors via the bus controllers for the example in FIG. 16.

The controlled precharging (slow) of the decoupling capacitors located at the input to the actuators can be implemented by the bus controller 52, while supposing that this consists of DC/DC converters, as illustrated in FIG. 24 (control action 65).

To obtain good flexibility in operation, it is preferable to have one DC/DC converter per actuator.

The methods of precharging the HVDC busbars will be analysed successively below.

1. First Method of Precharging the "Actuator" HVDC Busbar

Figure 25:
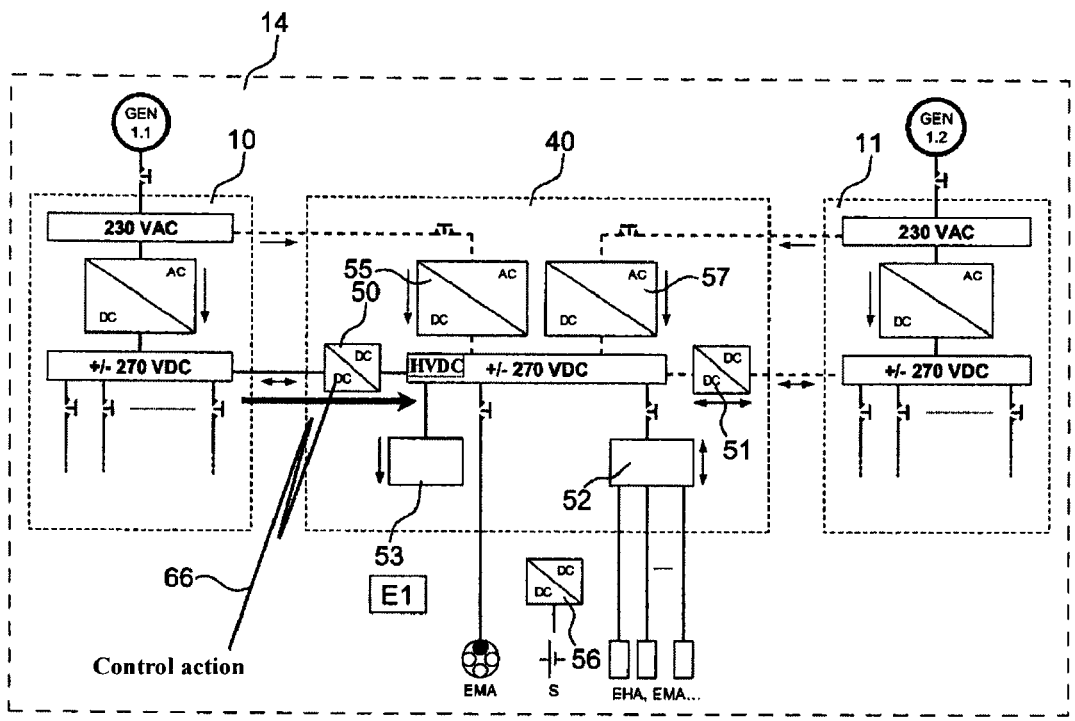
FIG. 25 illustrates a controlled precharging of the "actuator" bus capacitors by a transfer converter for the example in FIG. 16.

The controlled precharging of the capacitors present on the "actuator" HVDC bus can be implemented by a DC/DC transfer converter 50 or 51. The power originates from the HVDC busbar of a conventional master box, as illustrated in FIG. 25 (control action 66).

2. Second Method of Precharging the "Actuator" HVDC Busbar

Figure 26:
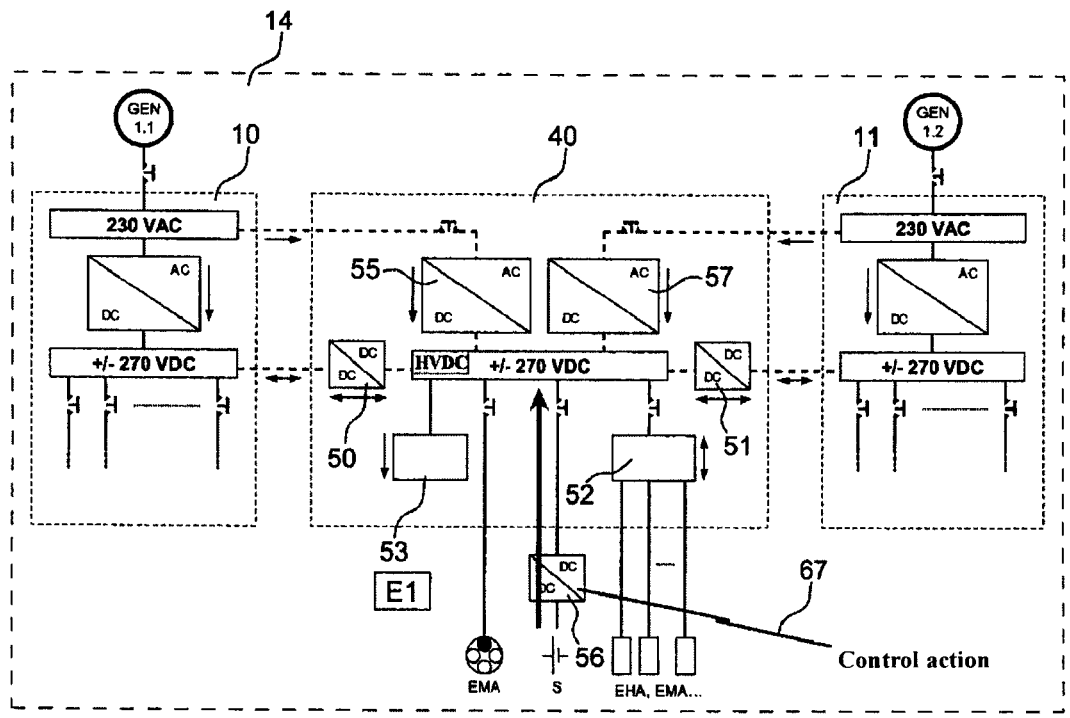
FIG. 26 illustrates a controlled precharging of the "actuator" bus capacitors by the storage system for the example in FIG. 16.

The slow precharging of the capacitors present on the "actuator" HVDC busbar can be implemented by the storage system S. The precharging is then controlled by the DC/DC storage converter 56, as illustrated in FIG. 26 (control action 67).

3. Third Method of Precharging the "Conventional" HVDC Busbar

Figure 27:
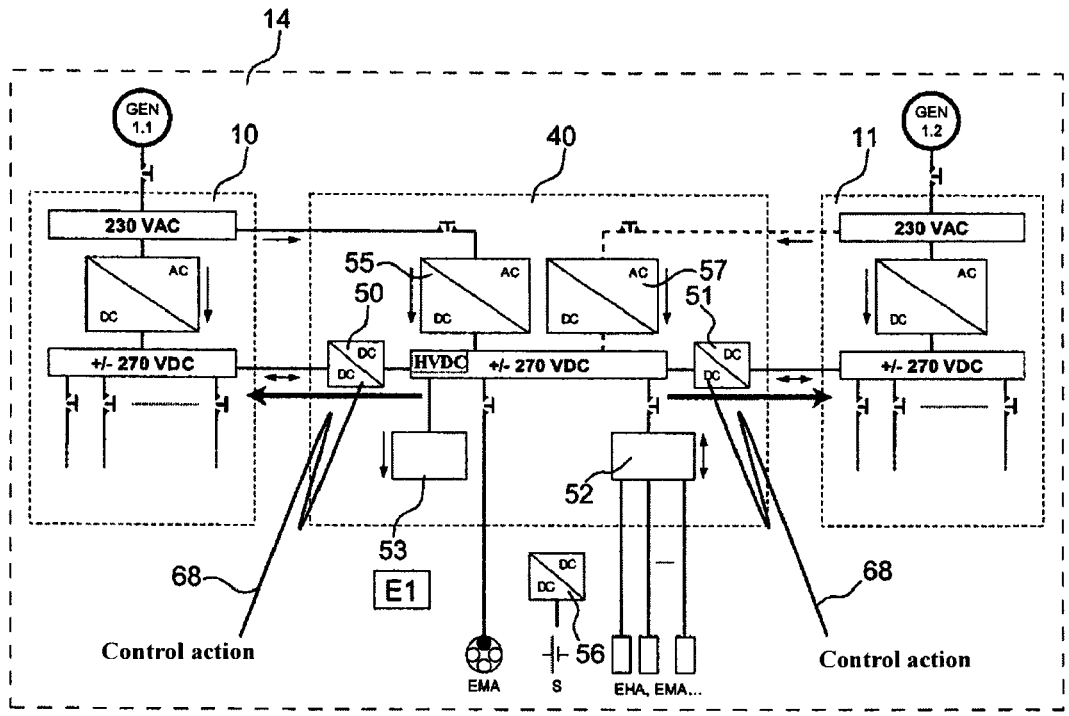
FIG. 27 illustrates a controlled precharging of the "conventional" bus capacitors by a transfer converter for the example in FIG. 16.

The controlled precharging of the capacitors present on a "conventional" HVDC busbar can be implemented via a transfer converter 50 or 51. The power then originates from the devoted master box 40, to a conventional master box 10 or 11, as illustrated in FIG. 27 (control action 68).

The invention claimed is:

1. A system for supplying power to a plurality of actuators on board an aircraft, the system comprising:
    a plurality of generators to supply alternating current;
    a plurality of conventional electrical master boxes configured to supply power to power loads, the plurality of conventional electrical master boxes having a plurality of power transfer units and being positioned at a first and second side of the aircraft, the power loads including air conditioning units, units to protect against icing and engine starters; and
    two devoted master boxes configured
        to each receive power from at least one conventional electrical master box via the plurality of power transfer units, and
        to supply the power only to actuator loads, the two devoted master boxes being connected to the plurality of conventional electrical master boxes at the first and second side of the aircraft, the actuator loads including flight control and wheel brakes.

2. The system according to claim 1, wherein an actuator of the plurality of actuators is positioned between a 230 volts alternating current network and a load and includes a direct current bus, a bus capacitor, an inverter, an electric motor, and a collective rectifier being shared by a plurality of actuators.

3. The system according to claim 1, wherein the plurality of power transfer units include an alternating current busbar and a direct current busbar.

4. The system according to claim 1, wherein at least one devoted master box includes an electric circuit for the actuators to provide a static conversion necessary to handle transfers of power between the plurality of generators and the actuators.

5. The system according to claim 4, further comprising:
    a first bidirectional power transfer unit configured to transfer power between the devoted master boxes and electrical circuits for the actuators.

6. The system according to claim 1, wherein a second power transfer unit of the plurality of power transfer units is configured to bidirectionally transfer power between the devoted master boxes and the conventional electrical master boxes.

7. The system according to claim 5, wherein the first bidirectional power transfer unit includes controllable converters.

8. The system according to claim 1, wherein a link between the devoted master boxes and the actuator loads uses direct current at a high voltage.

9. The system according to claim 6, wherein the second bidirectional power transfer unit includes controllable converters.

10. A method for supplying power to a plurality of actuators on board an aircraft, the method comprising:
    supplying, from a plurality of generators on the aircraft, alternating current;
    supplying, from a plurality of conventional electrical master boxes on the aircraft, power to power loads, the plurality of conventional electrical master boxes having a plurality of power transfer units and being positioned at a first and second side of the aircraft, the power loads including air conditioning units, units to protect against icing and engine starters;
    receiving, at each of two devoted master boxes on the aircraft, power from at least one conventional electrical master box via the plurality of power transfer units; and
    supplying, from the two devoted master boxes, the power only to actuator loads, the two devoted master boxes being connected to the plurality of conventional electrical master boxes at the first and second side of the aircraft, the actuator loads including flight control and wheel brakes,
    wherein a first bidirectional power transfer is provided between at least one devoted master box and an electric circuit for the actuators.

11. The method according to claim 10, wherein a transfer of power is made between at least one devoted master box and a conventional electrical master box of the plurality of conventional electrical master boxes.

12. The method according to claim 10, wherein power is supplied to the actuator loads via
- a second bidirectional power transfer unit of the plurality of power transfer units configured to transfer power between the devoted master boxes and the conventional electrical master boxes, or
- a HVDC supply, or
- a backed up power supply.

13. The method according to claim 10, wherein generated power is evacuated by the actuator loads via
- a rejection by a second bidirectional power transfer unit of the plurality of power transfer units configured to transfer power between the devoted master boxes and the conventional electrical master boxes, or
- a HVDC rejection, or
- a storage rejection, or
- a dissipation rejection.

14. The method according to claim 10, wherein capacitors on HVDC buses and the actuator loads are switched on gradually.

15. The method according to claim 10, wherein precharging of a HVDC busbar of a first devoted master box is provided via
- pre-charging the first devoted master box from an alternating current busbar of the plurality of power transfer units, or
- precharging a conventional electrical master box of the plurality of conventional electrical master boxes from a direct current busbar of the plurality of power transfer units, or
- precharging from a storage system.

16. The method according to claim 10, wherein power generated by the actuators during braking phases of the aircraft is recovered.

17. An aircraft comprising:
- a system to supply power to a plurality of actuators on board an aircraft, the system including
  - a plurality of generators configured to supply alternating current,
  - a plurality of conventional electrical master boxes configured to supply power to power loads, the plurality of conventional electrical master boxes having a plurality of power transfer units and being positioned at a first and second side of the aircraft, the power loads including air conditioning units, units to protect against icing and engine starters, and
  - two devoted master boxes configured
    - to each receive power from at least one conventional electrical master box via the plurality of power transfer units, and
    - to supply the power only to actuator loads, the two devoted master boxes being connected to the plurality of conventional electrical master boxes at the first and second side of the aircraft, the actuator loads including flight control and wheel brakes.

* * * * *